(No Model.)
H. MILLER.
COMBINED REEL AND BARREL CARRIER.
No. 513,129. Patented Jan. 23, 1894.
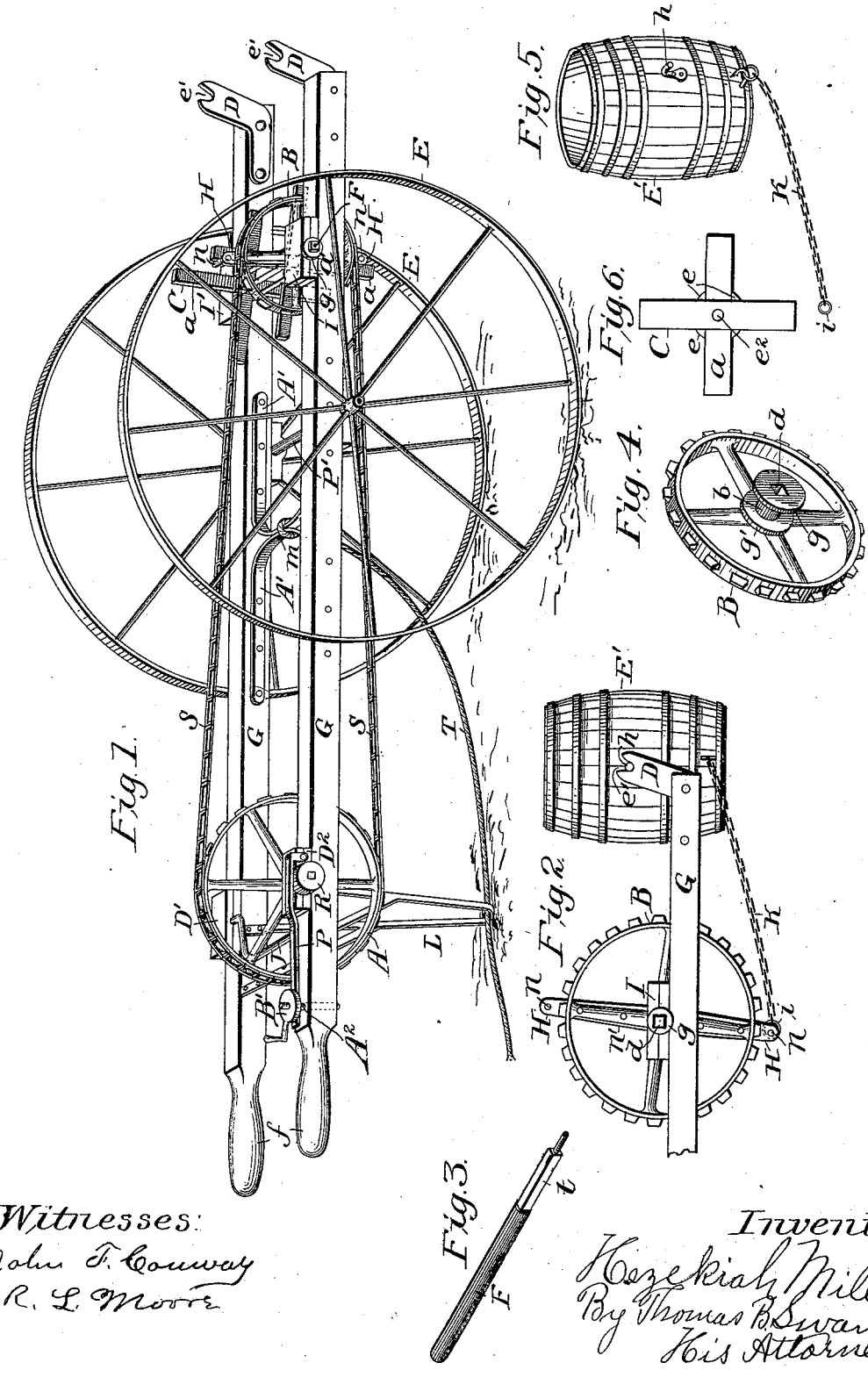
Witnesses:
John F. Conway
R. L. Moore
Inventor:
Hezekiah Miller
By Thomas B. Swan
His Attorney

UNITED STATES PATENT OFFICE.

HEZEKIAH MILLER, OF HAMLIN, ASSIGNOR OF ONE-HALF TO F. L. HENRY, OF ATLANTIC, IOWA.

COMBINED REEL AND BARREL-CARRIER.

SPECIFICATION forming part of Letters Patent No. 513,129, dated January 23, 1894.

Application filed June 17, 1893. Serial No. 478,012. (No model.)

*To all whom it may concern:*

Be it known that I, HEZEKIAH MILLER, a citizen of the United States, residing at Hamlin township, in the county of Audubon and State of Iowa, have invented certain new and useful Improvements in a Combined Reel and Barrel-Carrier; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in a combined reel and barrel carrier, and it consists in the peculiar construction and combination of the parts that will be more fully set forth hereinafter and particularly pointed out in the claims.

The objects of my invention are to provide a device by means of which fence wire can be readily stretched, and wound upon, or unwound from a spool and conveniently carried, and also which can be easily adapted to carry a barrel. I attain these objects by the device illustrated in the accompanying drawings in which—

Figure 1, is a perspective view of the device adapted to be used as fence wire spool carrier and winder. Fig. 2 is a view in side elevation of a portion of the device showing it adapted to carry a barrel. Fig. 3, is a detailed perspective view of the rod that supports the spool. Fig. 4, is a detailed perspective view of the rear sprocket wheel. Fig. 5, is a perspective view of the barrel and chain, and Fig. 6, is a detailed end view of the spool.

Similar letters refer to similar parts throughout the several views.

The longitudinal bars, G G, having handles $ff$, formed at their ends, the bent cross braces A' A', united by the bolt $m$, and each firmly secured to the bars G G, and the supporting brace L, having its ends bifurcated and firmly secured to the bars G G, constitute the frame of the device.

E E, are wheels, connected by the rod P', which turns in suitable bearings, upon which the frame is mounted.

D D, are barrel supports firmly secured to the rear ends of the longitudinal bars G G, and each provided with a notch $e'$, for the reception of the barrel lugs $h$.

C, is a spool, adapted to hold barbed fence wire, of ordinary construction, composed of the end crosses $a$, connected by the four bars $e$, each of the end crosses being provided with an aperture $e^2$.

A, is a sprocket wheel which is carried on a crank shaft J, and which is connected with the sprocket wheel B, by the sprocket chain S, which passes around the sprocket wheels A, and B, and engages with them. The crank shaft J, is supported by, and turns in suitable boxes, or bearings D' and $D^2$, and has firmly secured to one of its ends the wheel R.

The sprocket wheel B, is provided with the gudgeon $b$, which revolves in the box I, and has at its ends the flanges $g$, and $g'$. The gudgeon is firmly secured to the wheel by means of the flange $g'$, and the flange $g$, holds it within the box I; it has passing through it the square aperture $d$.

F, is a removable rod which passes through the aperture $e^2$, in the spool and supports it. The portion $t$, thereof is made square and fits the aperture $d$, of the gudgeon $b$, and the rod is held in position by the nut $a'$, which fits its threaded end of the rod. By removing the nut from the rod it can be withdrawn from the spool and from the gudgeon, with which it revolves in the box I'.

H, is a spool grab, composed of the plate $n'$, firmly secured to the sprocket wheel B, and two lugs $n$, which project laterally, one from each end of the plate.

P, is a brake which bears against the wheel R, and which is pivoted at one end to the box $D^2$, and the other end portion passes under and bears against the edge of the circular hand nut B'.

$A^2$, is a threaded bolt which passes through, and is secured to bar G, and has fitted to it, the hand nut B'.

T, is a rope having one end tied to the cross braces A'.

E', is a barrel having secured to its lower end the chain K. It has secured to its opposite sides two lugs $h$.

The operation of my device is as follows: When it is desired to wind fence wire upon the spool, one end of the wire is secured, or left secured to a fence post, and the other end is secured to one of the bars e, of the spool. The operator then seizes with one hand one of the handles f, and guides the device, and with the other hand turns the crank shaft J, and the spool is revolved and the wire wound thereon. When it is desired to unwind wire from the spool, a spool filled with wire is mounted upon the rod, and the brake is adjusted by turning the hand nut B', so that it presses with sufficient force upon the wheel R, to retard the revolution of the crank shaft slightly, so that the wire when being unwound will have a proper tension. One end of the wire is then secured to a fence post, and the operator then seizes the handles f f, and draws the device forward and the wire will be rapidly unwound from the spool. After the wire has been unwound as above explained, one end being secured to a fence post and the other to the spool, it can be stretched to any desired tension, by driving a stake into the ground, and anchoring the device to it by tying the free end of the rope T, to the stake, turning the crank shaft until the wire is stretched to the desired tension, then turning the hand nut B', and pressing the brake against the wheel R, with sufficient force to prevent the movement of the crank shaft.

My device is very useful in making wire fences, and in winding upon spools and removing old fence wire.

When my device is not employed in connection with fence wire, it can be readily adapted to carry a barrel as follows: Remove the spool from the rod. Then insert the lugs h, of the barrel in the notches e' e', of the barrel supports D D, and pass the ring i, secured to the end of the chain K, over the lower lug n, of the spool grab H. The barrel can then be readily transported, and by turning the crank shaft J, tilted and emptied of all or a portion of its contents as may be desired.

My device when adapted as above explained is very useful and convenient in transporting and emptying barrels of swill, or other commodities.

Having described my invention, what I claim as new, and desire to secure by Letters Patent, is—

1. The combination in a combined reel and barrel carrier of the frame mounted upon wheels, the crank shaft supported in suitable bearings, the sprocket wheel secured to the crank shaft, a sprocket wheel which turns on a gudgeon supported in a suitable bearing, and which has secured thereto the spool grab, the sprocket chain which engages with and connects the sprocket wheels, the removable rod which supports the spool, the barrel supports secured to the frame, the barrel pivoted by side lugs to the supports, and the chain which is secured at one end to the barrel and at the other end to the lower end of the grab, substantially as described.

2. The combination substantially as described of the frame mounted upon wheels, the barrel supports secured to the frame, the barrel pivoted by side lugs to the supports, the sprocket wheel provided with the grab, and which turns on a shaft supported in suitable bearings, the chain, which is secured at one end to the barrel and at the other end to the lower end of the grab, and the means for moving the grab.

In testimony whereof I affix my signature in presence of two witnesses.

HEZEKIAH MILLER.

Witnesses:
JOHN F. CONWAY,
GEO. LILE.